US011653094B2

(12) United States Patent
Sakurai

(10) Patent No.: US 11,653,094 B2
(45) Date of Patent: May 16, 2023

(54) IMAGING APPARATUS WITH SHAKING STATE INFORMATION DISPLAY

(71) Applicant: Panasonic Intellectual Property Management Co., Ltd., Osaka (JP)

(72) Inventor: Mikio Sakurai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/693,018

(22) Filed: Mar. 11, 2022

(65) Prior Publication Data

US 2022/0303465 A1  Sep. 22, 2022

(30) Foreign Application Priority Data

Mar. 19, 2021  (JP) .............................. JP2021-046516

(51) Int. Cl.
*H04N 23/68*  (2023.01)
*H04N 23/63*  (2023.01)

(52) U.S. Cl.
CPC ....... *H04N 23/6811* (2023.01); *H04N 23/632* (2023.01)

(58) Field of Classification Search
CPC ......... H04N 5/23254; H04N 5/232935; H04N 5/23258; H04N 5/2328; H04N 5/232939; H04N 5/23232; H04N 23/6811; H04N 23/632; H04N 23/633; H04N 23/6812; H04N 23/685; H04N 23/951
See application file for complete search history.

(56) References Cited

U.S. PATENT DOCUMENTS

| 2005/0057661 | A1  | 3/2005  | Tanaka    |            |
|--------------|-----|---------|-----------|------------|
| 2009/0213233 | A1* | 8/2009  | Kido      | H04N 5/3532 |
|              |     |         |           | 348/208.4  |
| 2011/0234826 | A1* | 9/2011  | Nguyen    | G03B 17/20 |
|              |     |         |           | 348/208.6  |
| 2014/0300766 | A1  | 10/2014 | Nakamura  |            |

FOREIGN PATENT DOCUMENTS

| JP | 2003-274281 A | 9/2003 |
| JP | 2005-064851 A | 3/2005 |
| JP | 2013-120980 A | 6/2013 |
| JP | 5396483 B2    | 1/2014 |

* cited by examiner

*Primary Examiner* — Ahmed A Berhan
(74) *Attorney, Agent, or Firm* — Renner, Otto, Boisselle & Sklar, LLP

(57) ABSTRACT

An imaging apparatus includes: an image sensor that captures a subject image to generate image data; a controller that controls an image shooting operation, based on image data resulting from a plurality of times of imaging by the image sensor, the image shooting operation generating image data indicating a synthetic image into which a plurality of captured images is synthesized; a shake detector that detects a shaking state of the imaging apparatus; and a display that displays information, wherein the controller controls the display to display shaking state information including a plurality of shaking states detected by the shake detector during the plurality of times of imaging by the image sensor in the image shooting operation for the synthetic image.

7 Claims, 16 Drawing Sheets

Fig. 10A  CAPTURED IMAGE
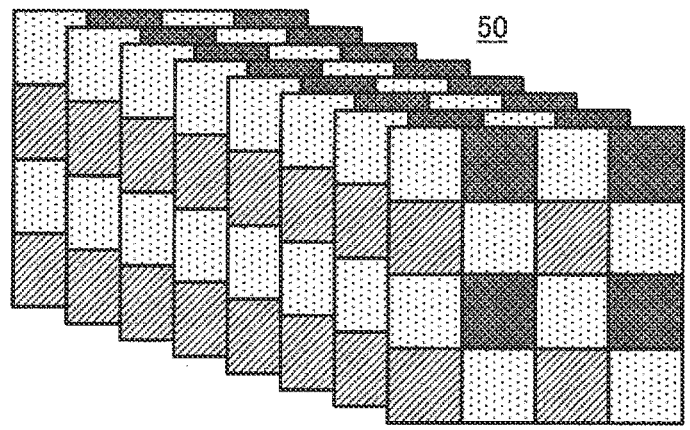
Fig. 10B  COLOR-CLASSIFIED SYNTHETIC DATA
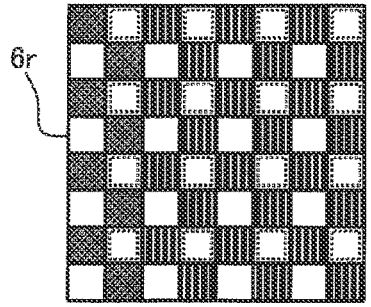
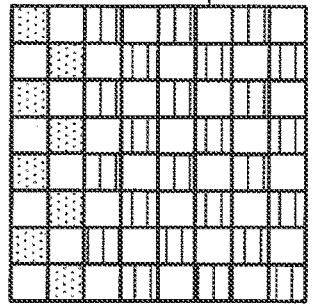
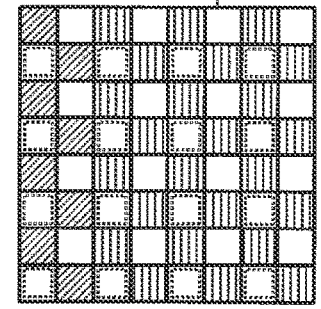
Fig. 10C  COMPLEMENTARY DATA
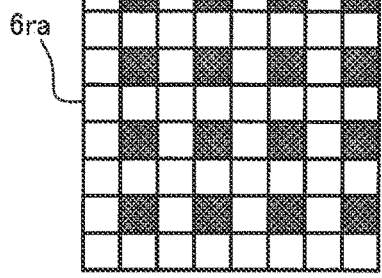
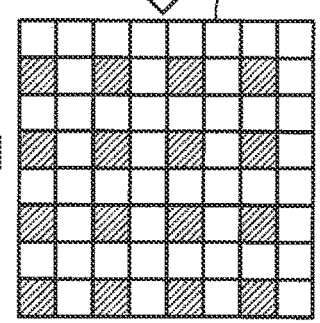
Fig. 10D  SYNTHETIC IMAGE
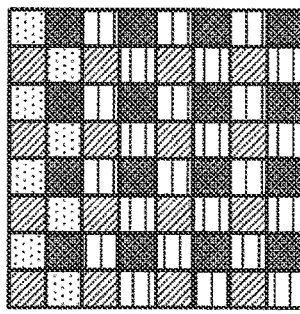

IMAGING APPARATUS WITH SHAKING STATE INFORMATION DISPLAY

BACKGROUND

1. Technical Field

The present disclosure relates to an imaging apparatus having a function of shooting and synthesizing plurality of images.

2. Related Art

JP 2003-274281 A discloses an imaging apparatus that synthesizes a plurality of sets of image signals, obtained while pixel shift is performed, to obtain a high-definition image. In the imaging apparatus of JP 2003-274281 A, an image stabilization actuator that drives a lens is controlled by a command for displacing an image for pixel shift. This imaging apparatus determines the magnitude of the amount of image shake during image synthesis processing and displays a warning indication indicating a large image shake on a display when the amount of image shake is a predetermined value or more. When the warning indication is made, the image is not synthesized by pixel shift, and the original image is recorded.

SUMMARY

The present disclosure provides an imaging apparatus that can facilitate shooting of a synthetic image even in a situation where camera shake occurs.

An imaging apparatus according to the present disclosure includes: an image sensor that captures a subject image to generate image data; a controller that controls an image shooting operation, based on image data resulting from a plurality of times of imaging by the image sensor, the image shooting operation generating image data indicating a synthetic image obtained into which a plurality of captured images is synthesized; a shake detector that detects a shaking state of the imaging apparatus; and a display that displays information. The controller controls the display to display shaking state information including a plurality of shaking states detected by the shake detector during the plurality of times of imaging by the image sensor in the image shooting operation for the synthetic image.

According to the imaging apparatus of the present disclosure, it is possible to facilitate shooting of a synthetic image even in a situation where camera shake occurs.

BRIEF DESCRIPTION OF THE DRAWINGS

FIGS. 10A to 10D are views for explaining image synthesis in the high-res synthesis processing;

DETAILED DESCRIPTION

Hereinafter, embodiments of the present disclosure will be described with reference to the relevant drawings. However, in the detailed description, unnecessary portions of the description relating to the prior art and the substantially identical configuration may be omitted. This is to simplify the description. In addition, the following description and the accompanying drawings are disclosed so as to enable those skilled in the art to fully understand the present disclosure and are not intended to limit the subject matter of the claims.

First Embodiment

In the first embodiment, an example of a lens-interchangeable digital camera having an image stabilizing function will be described as an example of an imaging apparatus.

1. Configuration

Figure 1:
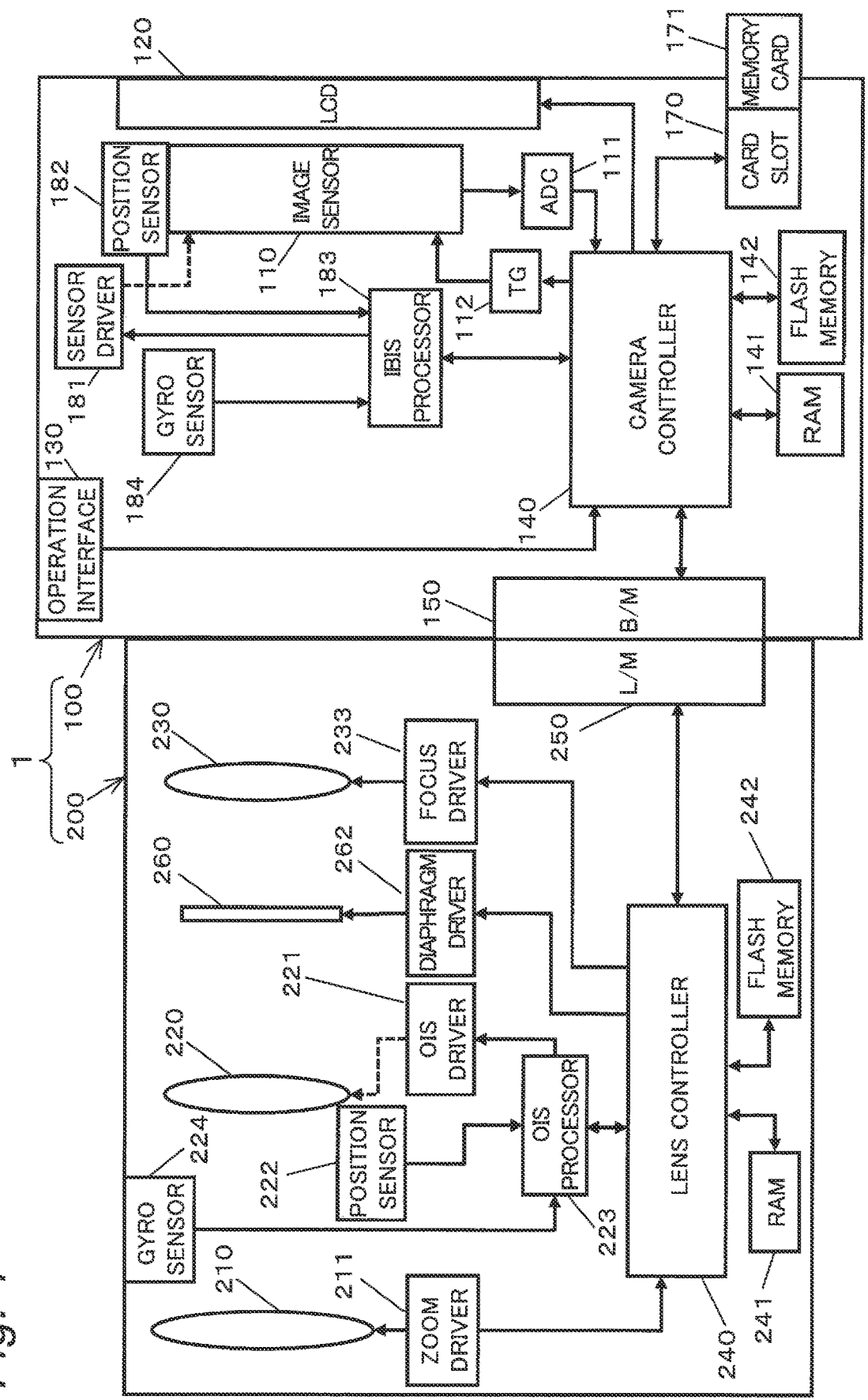
FIG. 1 is block diagram illustrating a configuration of a digital camera according to a first embodiment of the present disclosure.

FIG. 1 is a block diagram illustrating a configuration of a digital camera 1 according to the first embodiment. The digital camera 1 includes a camera body 100 and an interchangeable lens 200 attachable to and detachable from the camera body 100. In the following description, a function of moving the image sensor in the camera body 100 to perform image stabilization is referred to as an "in-body image stabilizing (IBIS) function". In the following description, a function of moving a correction lens in an interchangeable lens 200 to perform image stabilization will be referred to as an "optical image stabilizer (OIS) function".

1-1. Camera Body

The camera body 100 (an example of an imaging apparatus) includes an image sensor 110, a liquid crystal monitor 120, an operation interface 130, a camera controller 140, a body mount 150, and a card slot 170.

The camera controller 140 controls the entire operation of the digital camera by controlling constituents, such as the image sensor 110, in response to an instruction from a release button. The camera controller 140 transmits a vertical synchronization signal to a timing generator 112. In parallel with this, the camera controller 140 generates an exposure synchronization signal. The camera controller 140 periodically the generated exposure synchronization signal to a lens controller 240 via the body mount 150 and a lens mount 250. The camera controller 140 uses a dynamic random-access memory (DRAM) 141 as a work memory for control operations and image processing operations.

The image sensor 110 is an example of an image sensor that generates image data by capturing a subject image incident through the interchangeable lens 200. For example, the image sensor 110 is a charge-coupled device (CCD), a complementary metal-oxide-semiconductor (CMOS) image sensor, or an N-type metal-oxide-semiconductor (NMOS) image sensor. The generated image data is digitized by an analog-to-digital (AD) converter 111. The digitized image data is subjected to predetermined image processing by the camera controller 140. For example, the predetermined image processing is gamma correction processing, white balance correction processing, scratch correction processing, YC conversion processing, electronic zoom processing, and JPEG compression processing.

The image sensor 110 operates at a timing controlled by the timing generator 112. The image sensor 110 generates a still image or a moving image for recording or a through image (i.e., a live view image). The through image is mainly a moving image and is displayed on the liquid crystal monitor 120 so that a user determines a composition for capturing the still image.

The liquid crystal monitor 120 displays an image such as a through image and various information such as a menu screen. The liquid crystal monitor 120 is an example of a display in the present embodiment. Other types of display devices, such as an organic light-emitting (EL) display device, may be used in place of the liquid crystal monitor.

The operation interface 130 includes various operation members, such as a release button for instructing the start of image shooting, a mode dial for setting an image shooting mode, and a power switch. The operation interface 130 also includes a touch panel disposed overlapping the liquid crystal monitor 120.

The card slot 170 can be inserted with the memory card 171 and controls the memory card 171 on the basis of the control from the camera controller 140. The digital camera 1 can store image data into the memory card 171 and read image data from the memory card 171.

The body mount 150 is mechanically and electrically connectable to the lens mount 250 of the interchangeable lens 200. The body mount 150 is an example of a communication interface on the camera body 100 capable of transmitting and receiving data to and from the interchangeable lens 200 via the lens mount 250. The body mount 150 transmits an exposure synchronization signal received from the camera controller 140 to the lens controller 240 via the lens mount 250. The body mount transmits other control signals received from the camera controller 140 to the lens controller 240 via the lens mount 250. The body mount 150 transmits a signal received from the lens controller 240 to the camera controller 140 via the lens mount 250.

The camera body 100 further includes, as a configuration for implementing the IBIS function, a gyro sensor 184 (shake detector) for detecting the shake of the camera body 100, and an IBIS processor 183 for controlling shake correction processing on the basis of the detection result of the gyro sensor 184. The camera body 100 further includes a sensor driver 181 for moving the image sensor 110, and a position sensor 182 for detecting the position of the image sensor 110.

The sensor driver 181 can be produced with a magnet and a flat plate coil, for example. The sensor driver 181 may include others such as a motor or an actuator. The position sensor 182 is a sensor for detecting the position of the image sensor 110 in a plane perpendicular to the optical axis of the optical system. The position sensor 182 can be produced with a magnet and a Hall element, for example.

The IBIS processor 183 controls the sensor driver 181, based on a signal from the gyro sensor 184 and a signal from the position sensor 182, to shift the image sensor 110 into the plane perpendicular to the optical axis so that the shake of the camera body 100 is canceled out.

1-2. Interchangeable Lens

The interchangeable lens 200 includes an optical system, a lens controller 240, and a lens mount 250. The optical system includes a zoom lens 210, an optical image stabilizer (OIS) lens 220, a focus lens 230, and a diaphragm 260.

The zoom lens 210 is a lens for changing magnification of a subject image formed by the optical system. One or more lenses are included in the zoom lens 210. The zoom lens 210 is driven by a zoom driver 211. The zoom driver 211 includes a zoom ring operable by the user. Alternatively, the zoom driver 211 may include a zoom lever and an actuator or a motor. The zoom driver 211 moves the zoom lens 210 along the optical-axis direction of the optical system in response to an operation by the user.

The focus lens 230 is a lens for changing a focus state of a subject image formed on the image sensor 110 in an optical system. One or more lenses are included in the focus lens 230. The focus lens 230 is driven by a focus driver 233.

The focus driver 233 includes an actuator or a motor and moves the focus lens 230 along the optical axis of the optical system on the basis of the control of the lens controller 240. The focus driver 233 can be produced with a direct-current (DC) motor, a stepping motor, a servo motor, an ultrasonic motor, or the like.

The OIS lens 220 is an example of a stabilization that is a lens for stabilizing a subject image formed by the optical system of the interchangeable lens 200 in the OIS function. The OIS lens 220 moves in a direction to cancel out the shake of the digital camera 1 for reducing the shake of the subject image on the image sensor 110. One or more lenses are included in the OIS lens 220. The OIS lens 220 is driven by an OIS driver 221.

By receiving the control of an OIS processor 223, the OIS driver 221 shifts the GIS lens 220 in the plane perpendicular to the optical axis of the optical system. The OIS driver 221 can be produced with a magnet and a flat plate coil, for example. A position sensor 222 is a sensor for detecting the position of the OIS lens 220 in the plane perpendicular to the optical axis of the optical system. The position sensor 222 can be produced with a magnet and a Hall element, for example. The OIS processor 223 controls the OIS driver 221, based on an output of the position sensor 222 and an output of a gyro sensor 224 (shake detector).

The lens mount 250 is an example of communication interface on the interchangeable lens 200 capable of transmitting and receiving data to and from the camera body 100 via the body mount 150.

The diaphragm 260 adjusts the amount of light incident on the image sensor 110. A diaphragm driver 262 drives the diaphragm 260 to control the size of its aperture. The diaphragm driver 262 includes a motor or an actuator.

The gyro sensor 184 or 224 detects a shake (vibration) in one or more of the yaw direction, the pitch direction, and the roll direction, based on an angular velocity that is an angular change per unit time of the digital camera 1, for example. The gyro sensor 184 or 224 outputs an angular velocity signal indicating the detected amount of shake (angular velocity) to the IBIS processor 183 or the OIS processor 223. The angular velocity signal output by the gyro sensor 184 or 224 may include a wide range of frequency components caused by camera shake, mechanical noise, and the like. Other sensors capable of detecting the shake of the digital camera 1 may be used in place of the gyro sensor.

The camera controller 140 and the lens controller 240 may each be formed of a hard-wired electronic circuit or a microcomputer using a program. For example, the camera controller 140 and the lens controller 240 may be produced with various processors, such as a central processing unit (CPU), a microprocessor (MPU), a graphics processing unit (GPU), a digital signal processor (DSP), a field-programmable gate array (FPGA), an application specific integrated circuit (ASIC).

1-3. IBIS Processor

Figure 2:
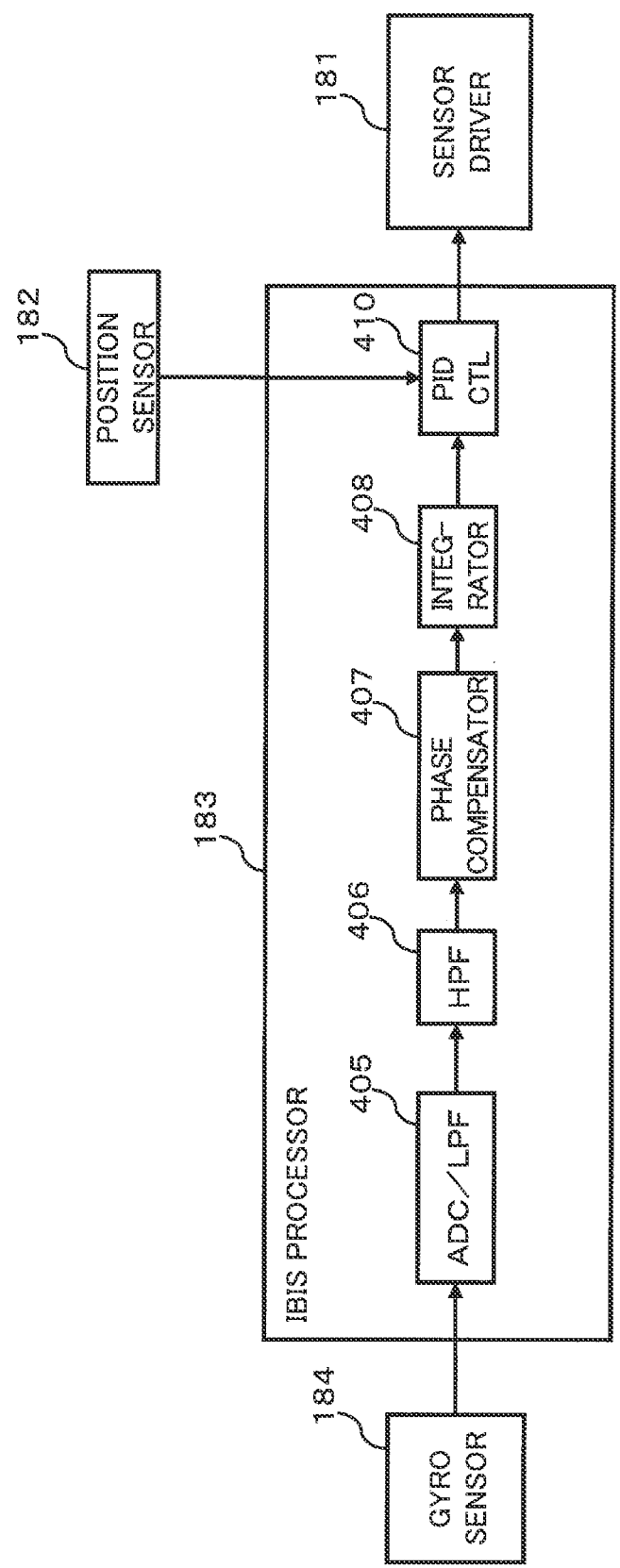
FIG. 2 is a block diagram illustrating a configuration of an in-body image stabilizer (IBIS) processor in the digital camera.

The configuration of the IBIS processor 183 in the camera body 100 will be described with reference to FIG. 2. The IBIS processor 183 includes an analog/digital converter (ADC)/low-pass filter (LPF) 405, a high-pass filter (HPF) 406, a phase compensator 407, an integrator 408, and proportional-integral-differential (PID) controller 410.

The ADC/LPF 405 converts the angular velocity signal from the gyro sensor 184 from an analog format to a digital format. Further, the ADC/LPF 405 blocks the high-frequency component of the angular velocity signal converted into the digital format in order to remove noise and extract only the shake of the digital camera 1. The frequency of the camera shake of a photographer is a low frequency of about 1 to 10 Hz, and the cutoff frequency of the LPF set in consideration of this viewpoint. When the noise causes no problem, the function of the LPF can be omitted.

The HPF 406 blocks a predetermined low-frequency component included in a signal received from the ADC/LPF 405 in order to block a drift component.

The phase compensator 407 corrects, for a signal received from the HPF 406, a phase delay caused by the sensor driver 181 or the like.

The integrator 408 integrates the signal indicating the angular velocity of the shake (vibration) input from the phase compensator 407 to generate a signal indicating the angle of the shake (vibration) (hereinafter referred to as a "shake detection signal"). The shake detection signal from the integrator 408 is input to the PID controller 410.

Based on the output from the position sensor 182 and the output from the integrator 408, the PID controller 410 generates a drive signal for shifting the image sensor 110 and outputs the generated signal to the sensor driver 181. The sensor driver 181 drives the image sensor 110 on the basis of the drive signal.

The IBIS processor 183 is configured to be capable of data communication with the camera controller 140. For example, the IBIS processor 183 starts/ends the image stabilizing operation in accordance with a control signal from the camera controller 140. The IBIS processor 183 transmits various information regarding the image stabilizing operation to the camera controller 140.

In the same configuration as the IBIS processor 183 as described above, the OIS processor 223 can be configured to drive the OIS driver 221 instead of the sensor driver 181, for example. The OIS processor 223 operates based on a detection result of the gyro sensor 224 in the interchangeable lens 200 instead of the gyro sensor 184 in the camera body 100, for example.

2. Operation

The operation of the digital camera 1 configured as described above will be described below.

The digital camera 1 of the present embodiment has an operation mode (hereinafter referred to as a "handheld high-res shooting mode") performing imaging a plurality of times with the digital camera 1 being held by the user and synthesizing the plurality of captured images to generate a high-resolution synthetic image. The digital camera 1 can be set to the handheld high-res shooting mode by the user's operation on the operation interface 130 such as a setting menu.

In the handheld high-res shooting mode, a synthetic image is generated from a plurality of captured images each having positional deviation in units of ½ pixels by making use of camera shake caused when the user holds the digital camera 1 during a plurality of times of imaging. At this time, when camera shake occurs excessively, the angle of view of the synthetic image would be reduced, and eventually, image synthesis would fail. To address this, the digital camera 1 of the present embodiment facilitates the user to suppress the camera shake by visualizing the state of the camera shake to the user during the plurality of times of imaging in the handhold high-res shooting mode. Details of the operation of the digital camera 1 in the present embodiment will be described below.

2-1. Handheld High-Res Shooting Operation

The operation of the handheld high-res shooting mode in the digital camera 1 of the present embodiment will be described with reference to FIGS. 3 and 4.

Figure 3:
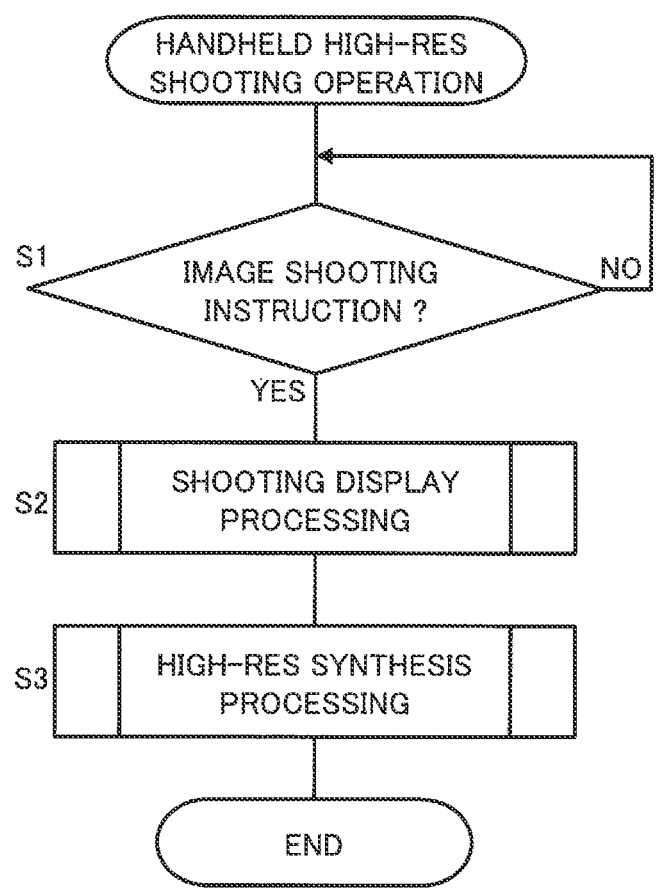
FIG. 3 is a flowchart illustrating a handheld high-res shooting operation in the digital camera.

FIG. 3 is a flowchart illustrating the handheld high-res shooting operation in the digital camera 1. The handheld high-res shooting operation is an example of the image shooting operation for the synthetic image in the present embodiment. For example, the processing illustrated in the flowchart of FIG. 3 is started with a live view screen indicating a live view image being displayed on the digital camera 1, and is executed by the camera controller 140.

At first, the camera controller 140 receives an input of an instruction to start image shooting in accordance with the user's operation on the operation interface 130, for example (S1). The user can input the image shooting instruction by an operation of pressing the release button in the operation interface 130, for example.

When the image shooting instruction is input (YES in S1), the camera controller 140 performs shooting display processing, which is processing to display the state of camera shake on the liquid crystal monitor 120 while performing a plurality of times of imaging to generate one synthetic image, for example (S2). A display example in step S2 is illustrated in FIG. 4.

Figure 4:
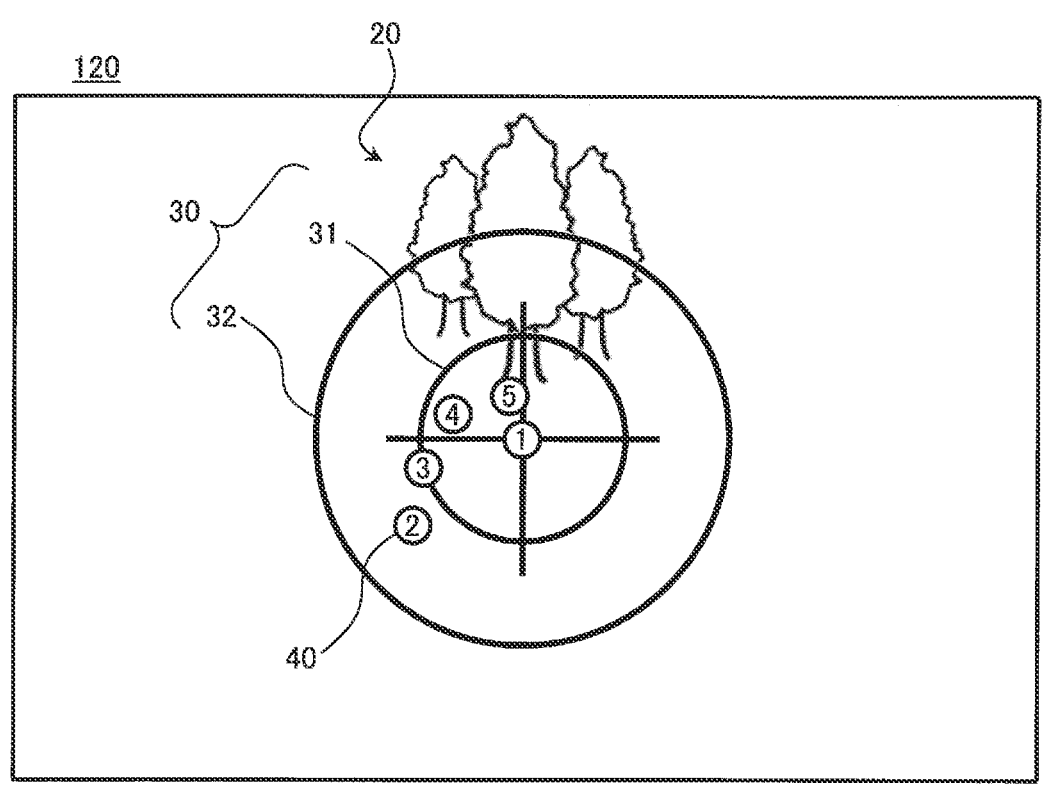
FIG. 4 is a view for explaining a camera shaking state screen in the digital camera according to the first embodiment.

FIG. 4 illustrates a display example of a camera shaking state screen that is a screen for visualizing the camera shaking state during the plurality of times of imaging in the shooting display processing (S2) of the present embodiment. With viewing the camera shaking state screen, the user can keep the held posture of the digital camera 1 until the plurality of times of imaging in step S2 is completed. Details of the shooting display processing (S2) will be described later.

Next, based on the image data of a plurality of captured images obtained as image shooting results of the shooting display processing (S2), the camera controller 140 performs high-res synthesis processing to generate image data indicating a synthetic image (S3). For example, the high-res synthesis processing (S3) generates high-resolution image data having the number of pixels of the synthetic image larger than that of one original captured image, based on data of a portion in which the same subject image appears among the plurality of captured images each having the positional deviation of about ½ pixels. Details of the high-res synthesis processing (S3) will be described later.

For example, the camera controller 140 records the image data of the synthetic image by the high-res synthesis processing (S3) into a memory card 171, and ends the processing shown in this flowchart.

According to the handheld high-res shooting operation described above, based on the plurality of captured images that are shot with deviating from each other by the camera shake during the shooting display processing (S2), the digital camera 1 performs the high-res synthesis processing (S3) to generate a high-resolution synthetic image.

In the high-res synthesis processing (S3), the required positional deviation among the plurality of captured images is considered to be small enough to occur unintentionally when the user holds the digital camera 1. On the other hand, when the positional deviation among the plurality of captured images is too large due to excessive camera shake, the decrease of the angle of view of the synthetic image is caused.

To address this, the digital camera 1 of the present embodiment displays the camera shaking state screen (S2) as exemplified in FIG. 4 during imaging before synthesis, to assist the user for suppressing the camera shake.

In the example of FIG. 4, the camera shaking state screen includes a preview image 20, a scope portion 30 superimposed and displayed on the preview image 20, and a plurality of camera shake pointers 40 displayed with plotting. For example, the preview image 20 is a live view image immediately before the start of the shooting display processing (S2). The scope portion 30 is an example of a reference area indicating an allowable range of the camera shaking state during the operation in the handheld high-res shooting mode.

Each camera shake pointer 40 indicates a camera shaking state for one captured image in the shooting display processing (S2), and is plotted in accordance with the amount of camera shake in each time of imaging. In the example of FIG. 4, each camera shake pointer 40 displays a number indicating the order of the image capturing. The shape of the camera shake pointer 40 is a circular shape, for example.

For example, the user can recognize the camera shaking state for the shot image in accordance with the position where the camera shake pointer 40 is displayed with respect to the scope portion 30 or the camera shaking state screen. In the example of FIG. 4, the scope portion 30 includes two areas 31, 32 set concentrically.

In the scope portion 30 illustrated in FIG. 4, the inner area 31 indicates an allowable range for the amount of camera shake with which the image quality (or the angle of view) of the synthetic image can be ensured, for example. For example, the inner area 31 is set in accordance with the number of pixels of the margin in the high-res synthesis processing (S3). The outer area 32 indicates an allowable range for the amount of camera shake with which the high-res synthesis processing (S3) can work although the image quality of the synthetic image is reduced, for example. For example, the outer area 32 is set in accordance with a predetermined number of pixels (allowable value) larger than the margin. Additionally, in the present example, the scope portion 30 displays cross lines attached to the area 31 as a reference of a camera shaking direction.

2-2. Shooting Display Processing

Details of the shooting display processing (S2 in FIG. 3) in the handheld high-res shooting operation of the present embodiment will be described with reference to FIGS. 5 to 7.

Figure 5:
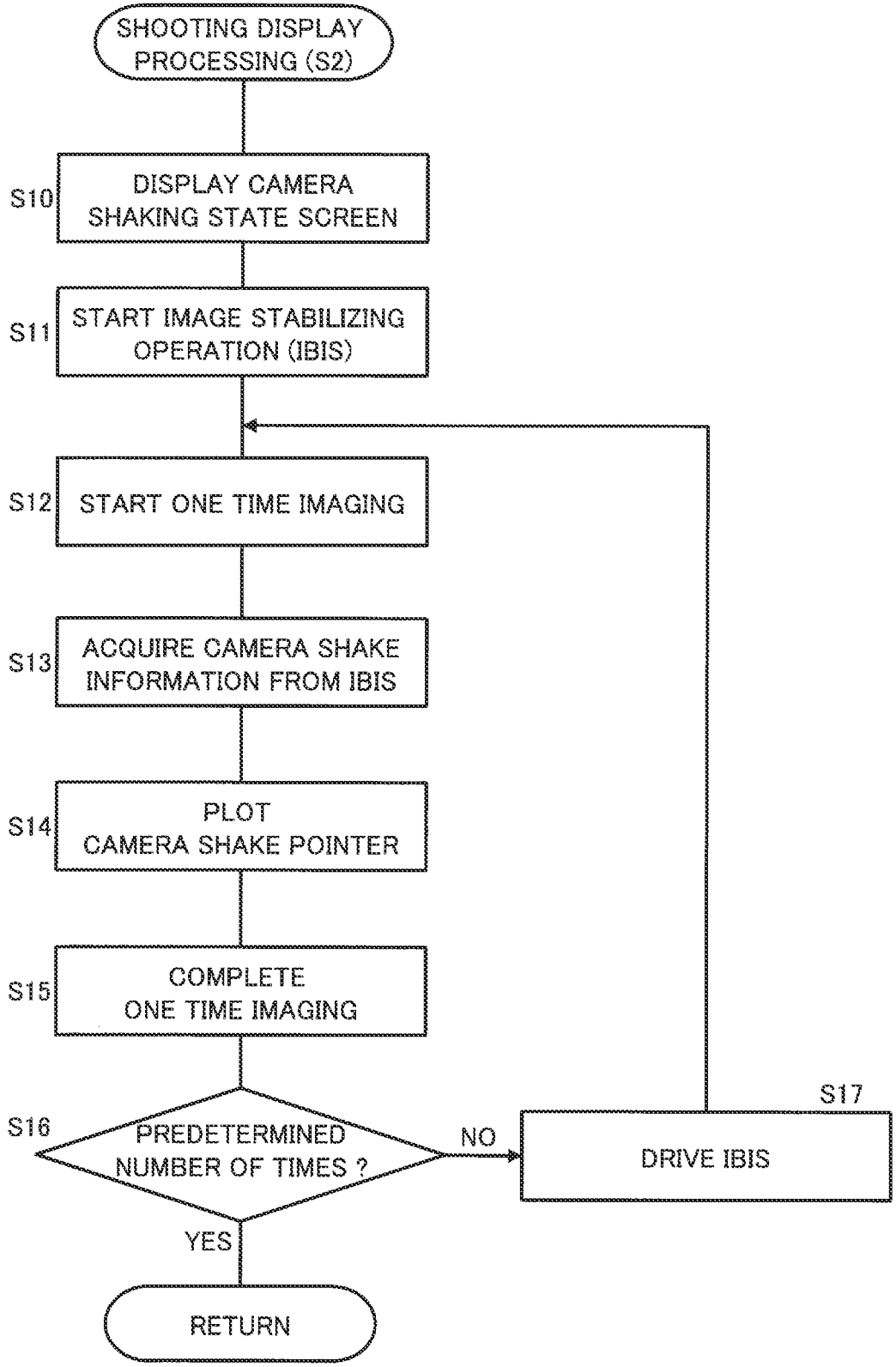
FIG. 5 is a flowchart illustrating shooting display processing of the digital camera according to the first embodiment.

FIG. 5 is a flowchart illustrating the shooting display processing of the digital camera 1 according to the present embodiment. FIG. 6 is a view for explaining the shooting display processing according to the present embodiment. The processing illustrated in the flowchart of FIG. 5 is started when a shooting instruction is input in the handheld high-res shooting mode (YES in S1 of FIG. 3), for example.

At first, the camera controller 140 controls the liquid crystal monitor 120 to transition from the live view screen to the camera shaking state screen, for example (S1). For example, as an initial screen of the camera shaking state screen, the camera controller 140 causes the scope portion 30 to be superimposed and displayed on the preview image 20 based on the live view image immediately before step S2 (cf. FIG. 6A). For example, at the time of step S10, the camera shake pointer 40 is not particularly displayed.

The camera controller 140 causes the IBIS processor 183 to start an image stabilizing operation, for example (S11). For example, the IBIS processor 183 (FIG. 2) inputs a signal from the gyro sensor 184 to start generating a shake detection signal by the integrator 408 or the like. In the IBIS processor 183, the PID controller 410 controls the sensor driver 181 in accordance with the generated shake detection signal and sequentially shifts the position of the image sensor 110.

Next, the camera controller 140 causes the image sensor 110 to start exposure for one time of imaging (S12). The image sensor 110 performs exposure by light incident only for a preset exposure period. During the exposure period, the image stabilizing operation by the IBIS processor 183 is performed moment by moment.

At this time, the camera controller 140 acquires the camera shake information corresponding to the camera shaking state per imaging from the IBIS processor 183, for example (S13). The camera shake information indicates a remaining amount of camera shake, which excludes the corrected amount of camera shake by the image stabilizing operation of the IBIS processor 183, in the amount of camera shake at the start timing of the exposure period, for example.

For example, the IBIS processor 183 calculates the amount of camera shake before the correction from the integration of the angular velocity detected by the gyro sensor 184. The performed amount of image stabilization is obtained from the displacement of the image sensor 110 detected by the position sensor 182, the driven amount of the sensor driver 181 by the PID controller 410, or the like. The camera controller 140 acquires, as the camera shake information, a calculation result of subtracting the amount of image stabilization from the amount of camera shake before the correction (S13).

Figure 6A:
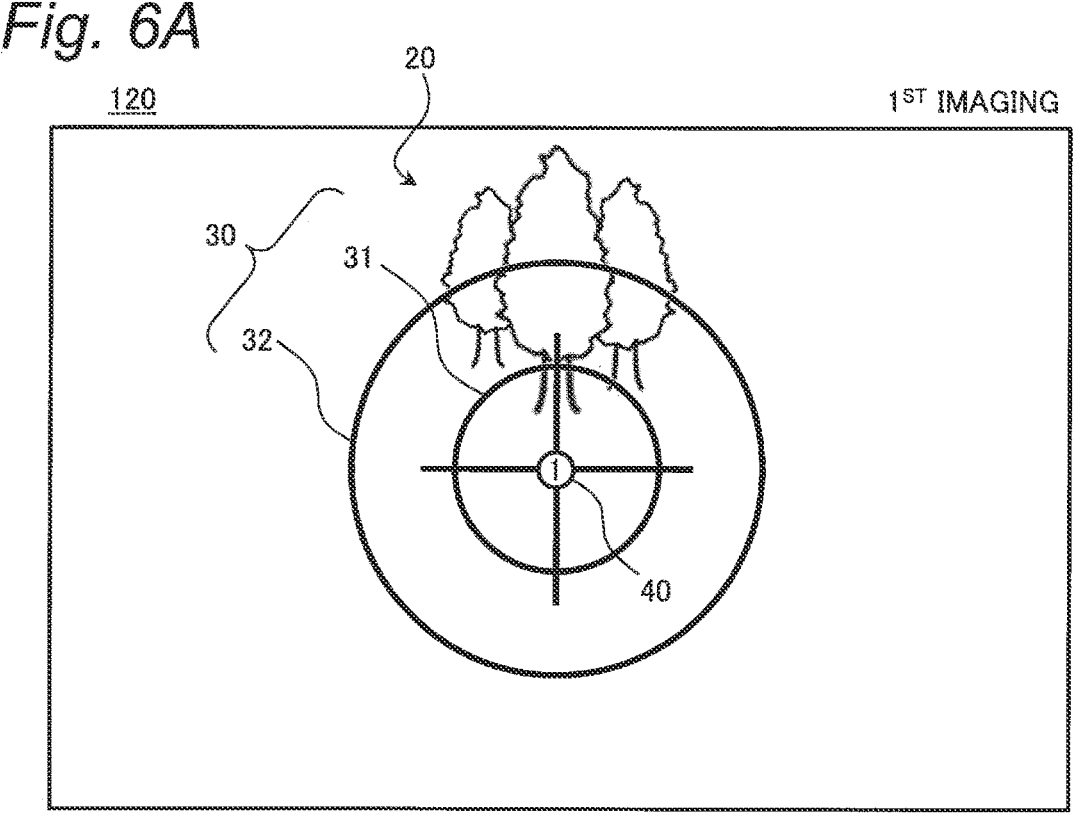
FIGS. 6A and 6B are views for explaining the shooting display processing of the digital camera according to the first embodiment.

Next, based on acquired camera shake information, the camera controller 140 causes the camera shake pointer 40 to be plotted and displayed, as information indicating the camera shaking state of one time of imaging, additionally to the camera shaking state screen displayed on the liquid crystal monitor 120, for example, (S14). FIG. 6A illustrates an example of the display in step S14. Here, the information to be displayed is the camera shake information, but the amount of camera shake may be used alternatively. The subsequent processing may be performed using the amount of camera shake.

FIG. 6A illustrates a display example of the camera shaking state screen in the first step S14. For example, when acquiring the camera shake information of the first imaging (S13), the camera controller 140 causes the camera shake pointer 40 to be displayed at a reference position such as the center of the scope portion 30 on the camera shaking state screen (S14). At time, the preview image 20 may be shifted by the amount of camera shake indicated by the acquired camera shake information, for example.

For example, when the exposure for one time of imaging is completed (S15), the camera controller 140 determines whether or not the number of times of imaging reaches a predetermined number of times (S16). The predetermined number of times is set in advance to be equal to or more than the number of captured images which are to be synthesized in the high-res synthesis processing (S3), and is set to e.g. 16 times.

Figure 6B:
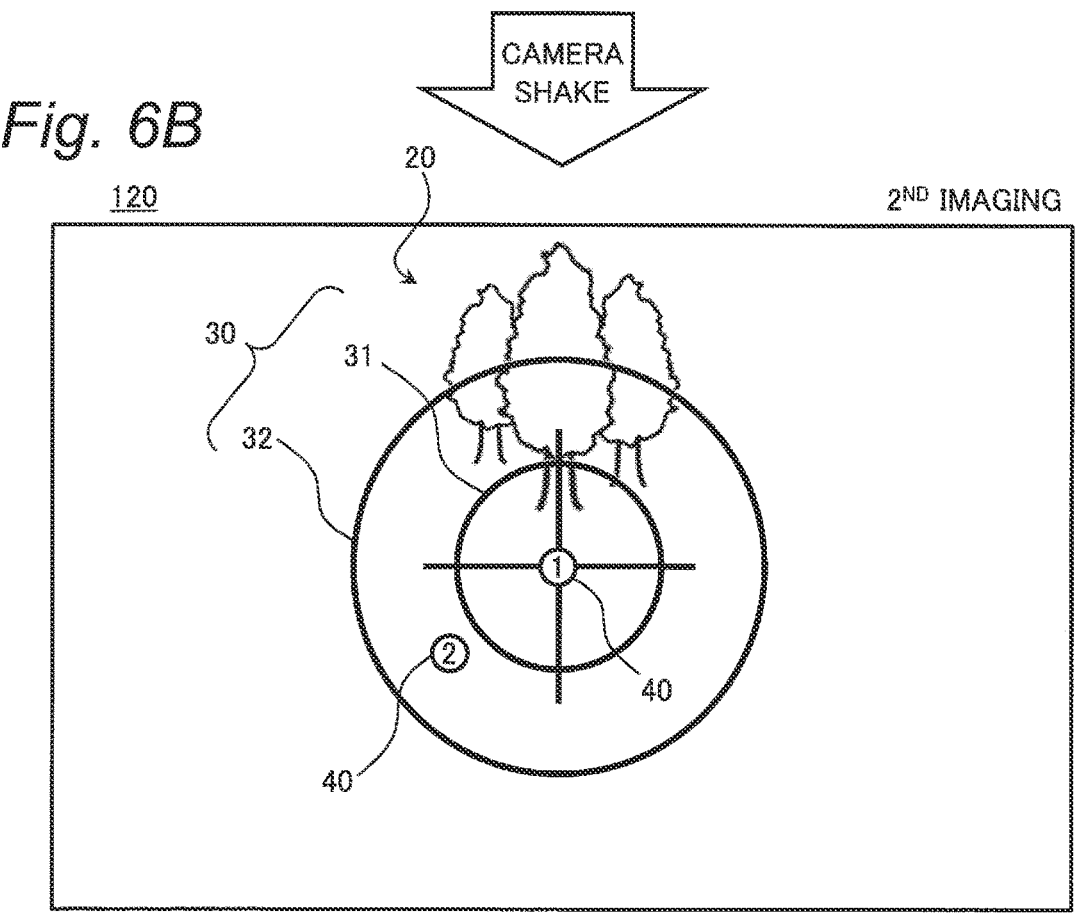

When the number of times of imaging does not reach the predetermined number of times (NO in S16), the camera controller 140 drives and controls the IBIS processor 183 to continue the image stabilizing operation (S17), and executes the processing onward step S12 again, for example. By repeating steps S12 to S15, the imaging is performed a plurality of times, and the plot display of the camera shaking state screen is updated in turn (S14). FIG. 6B illustrates a display example of step S14 in the second imaging.

FIG. 6B illustrates the camera shaking state screen updated from the state of FIG. 6A. For example, in steps S12 to S15 of the second time, the camera controller 140 causes a new camera shake pointer 40 to be plotted at a position shifted by the amount of camera shake, which is indicated by the camera shake information acquired in step S13, with reference to the position of the first camera shake pointer 40 on the camera shaking state screen (S14). At this time, the preview image 20 and the like are fixed without particularly linked with the amount of camera shake, for example. The user can see that camera shake has occurred by the amount of deviation of the position where the second camera shake pointer 40 is plotted from the first camera shake pointer 40.

Similarly to the above, the camera controller 140 causes the camera shaking state screen to be updated and displayed in turn so that the new camera shake pointer 40 is plotted at a position shifted by the amount of camera shake from the reference camera shake pointer 40 (S14). Consequently, the plot of camera shake pointer 40 visualizing the camera shaking state for each time of imaging can be obtained on the camera shaking state screen (cf. FIG. 4).

When the number of times of imaging reaches the predetermined number of times (YES in S16), the camera controller 140 returns the screen display of the liquid crystal monitor 120 from the camera shaking state screen to the live view screen, and ends the shooting display processing (S2 in FIG. 3), for example. Thereafter, the camera controller 140 executes high-res synthesis processing (S3), based on the image data of the imaging results by the shooting display processing.

According to the above shooting display processing (S2), during the imaging for generating the synthetic image by the predetermined number of times in the handheld high-res shooting operation, the camera shake pointers 40 each indicating the camera shaking state for each time of imaging can be sequentially plotted and displayed on the camera shaking state screen (S14).

FIG. 6B illustrates a case where the amount of camera shake during the second imaging exceeds the margin corresponding to the inner area 31 of the scope portion 30. By viewing the plot of the camera shake pointer 40 on the camera shaking state screen, the user can easily understand the camera shaking state in which the latest captured image deviates from the first captured image. FIG. 4 illustrates a case where the user who has looked at the camera shake pointer 40 in FIG. 6B suppresses the camera shake by giving attention to the camera shake pointer 40 to be settled within the area 31 thereafter.

As described above, even when a captured image having significant camera shake is generated from the time of the first imaging, the user can visually recognize the camera shaking state with the camera shake pointer 40 and easily understand the direction to improve the camera shake during subsequent imaging. Thus, with the camera shaking state screen in the shooting display processing (S2) of the present embodiment, the user can easily reduce the relative camera shake in the plurality of captured images. Consequently, the image quality of the synthetic image can be improved.

In such kind of a camera shaking state screen, for example, it is also conceivable to display the entire camera shaking state that changes from moment to moment during each exposure period in the plurality of times of imaging by using a trajectory of the camera shake pointer 40. However, in this case, there is a concern that the display of the camera shaking state screen is so complicated that the user is hard to see the camera shaking state. In contrast, according, to the shooting display processing (S2) of the present embodiment, the intermittent display in which the camera shake pointer 40 is plotted for each imaging (cf. FIG. 4) facilitates the user to see the camera shaking state when imaging as in the handheld high-res shooting mode is performed a plurality of times.

In step S13 described above, the example to acquire the camera shake information based on the start timing of the exposure period is described. The camera shake information is not limited thereto but may be based on the middle of the exposure period or the completion timing, or various average values in the amount of camera shake at a plurality of timings during the exposure period may be used.

In step S14 described above, additionally to the plot display of the camera shake pointer 40, a message regarding the camera shaking state may be displayed on the camera shaking state screen, for example. Such modification will be described with reference to FIG. 7.

Figure 7:
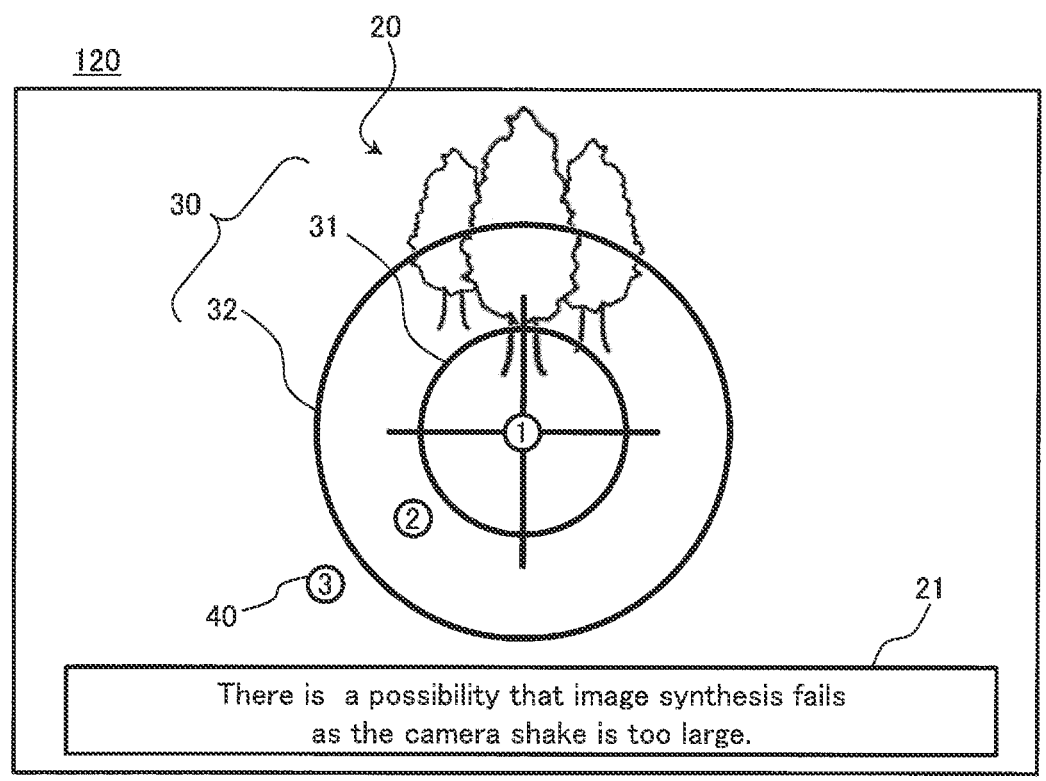
FIG. 7 is a view for explaining a modification of the shooting display processing of the digital camera according to the first embodiment.

FIG. 7 illustrates a display example of the camera shaking state screen in a case where the amount of camera shake exceeds the allowable value corresponding to the outer area 32 of the scope portion 30 during imaging after FIG. 6B. The camera controller 140 of the present modification may determine whether or not the amount of camera shake indicated by the camera shake information acquired in step S13 exceeds an allowable value. When the amount of camera shake exceeds the allowable value, the camera controller 140 of the present modification may control to display a message 21 for cautioning a possibility that image synthesis fails due to an excessive camera shaking state as illustrated in FIG. 7, together with the plot of the camera shake pointer 40 in step S14.

Such message display can also facilitate the user to see the camera shaking state during the plurality of times of imaging for the image synthesis. Furthermore, as in the example of FIG. 7, the digital camera 1 may display a message for calling attention when the area exceeds the inner area 31 of the scope portion 30.

2-3. High-Res Synthesis Processing

Details of the high-res synthesis processing (S3 in FIG. 3) in the present embodiment will be described with reference to FIGS. 8 to 10.

Figure 8:
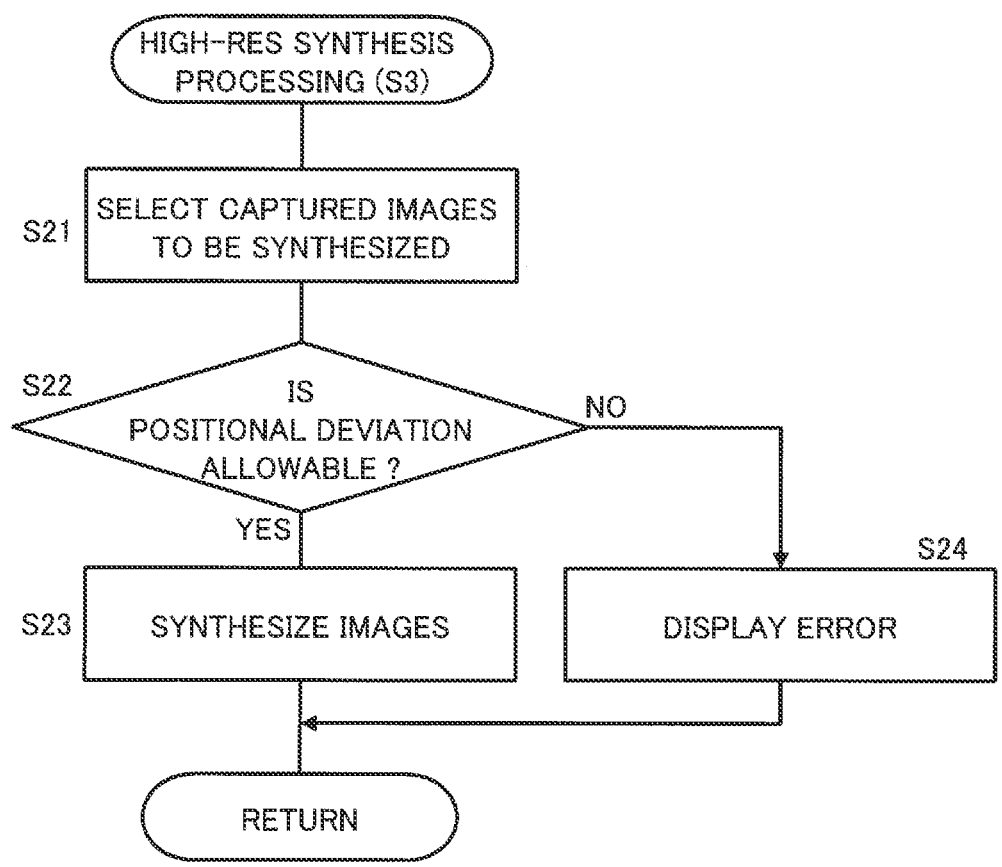
FIG. 8 is a flowchart illustrating high-res synthesis processing of the digital camera according to the embodiment.

FIG. 8 is a flowchart illustrating the high-res synthesis processing of the digital camera 1 according to the present embodiment. The processing illustrated in the flowchart of FIG. 8 is started with the shooting display processing (S2 in FIG. 3) completed in the handheld high-res shooting operation, for example.

At first, based on the image shooting results of the shooting display processing (S2 in FIG. 3), the camera controller 140 selects, from a plurality of obtained captured images (e.g., 16 captured images), eight captured images to be synthesized, for example (S21). The processing of step S21 will be described with reference to FIG. 9.

Figure 9:
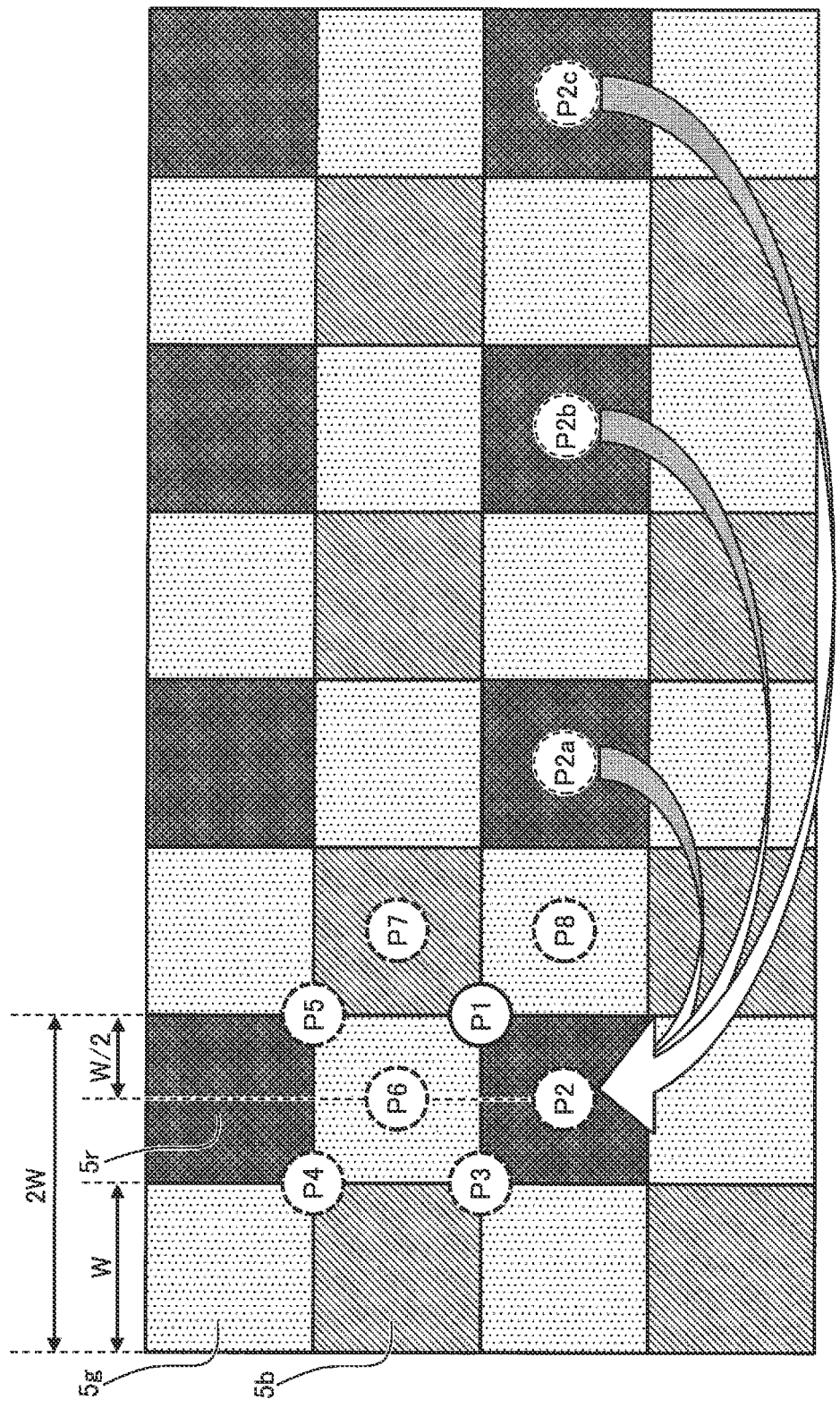
FIG. 9 is a view explaining a positional relation in images to be synthesized in the high-res synthesis processing.

FIG. 9 is a view explaining a positional relation (P1 to P8) in images to be synthesized in the high-res synthesis processing. FIG. 9 illustrates the arrangement of pixels 5r, 5g, 5b of the respective colors in the image data of the captured image. The red pixels 5r, the green pixels 5g, and the blue pixels 5b are arranged in a two-dimensional array of the Bayer arrangement and have a cycle 2W that is twice a pixel pitch W.

FIG. 9 illustrates a reference position P1 that is a certain position in a reference image that is a captured image as a reference among the captured images to be synthesized, and positions P2 to P8 each corresponding to the reference position P1 in each of the other captured images to be synthesized. The reference position P1 and the corresponding positions P2 to P8 are associated with each other when the portion of the same subject image appears in the respective captured images.

As illustrated in FIG. 9, the reference position P1 and the corresponding positions P2 to P8 are in the relation of positions deviating from each other in units of ½ times the pixel pitch W. For example, the case of the corresponding position P2 can be equated with respective cases where the above-described portion of the subject image appears at positions P2a, P2b, 22c away from the corresponding position P2 by integral multiples of the cycle 2W of the Bayer arrangement, by performing image data processing to shift the respective captured images every cycle 2W.

Based on the positional relation as described above (P1 to P8), the camera controller 140 uses the first captured image as the reference image, and selects captured images having positional relation closest to the corresponding positions P2 to P8 with respect to the reference position P1, for example (S21). For the processing of step S21, the above-described equation based on the cycle 2W of the Bayer arrangement is applied.

For example, in step S21, the camera controller 140 compares the other captured images respectively with the reference image for each of the appropriately divided areas, detects the positional deviation of each captured image with respect to the reference image, and calculates the positional deviation as the remainder obtained by dividing the detected positional deviation by the Bayer cycle 2W. The camera controller 140 selects, as a synthesis target, captured images each having the calculated positional deviation closest to the positional deviation between the reference position P1 and each of the corresponding positions P2 to P8.

Next, the camera controller 140 determines whether or not the positional deviation in the image data of the selected captured images is within a range of a preset allowable value, for example (S22). In step S22, not the positional deviation of the remainder of the cycle 2W used in step S21 but the positional deviation including the shift made every cycle 2W is subjected to the determination, for example.

When determining that the positional deviation between the selected captured images is within the range of the allowable value (YES in S22), the camera controller 140 performs the processing to synthesize the selected eight captured images (S23). The processing of step S22 will be described with reference to FIG. 10.

FIG. 10 is a view for explaining image synthesis in the high-res synthesis processing. FIG. 10A illustrates image data 50 of a captured image to be synthesized. FIG. 10B illustrates color-classified synthetic data 6r, 6g, 6b based on the image data 50 of FIG. 10A. FIG. 100 illustrates complementary data 6ra, 6ba for the synthetic data 6r, 6b of FIG. 10B. FIG. 10B illustrates image data 60 of the synthetic image based on the data 6ra, 6g, 6ba of FIGS. 10B and 10C.

For example, in step S23, the camera controller 140 first generates the synthetic data 6r, 6g, 6b for the respective colors from the image data 50 to be synthesized as illustrated in FIGS. 10A and 10B. The synthetic data 6r, 6g, 6b of the respective colors are generated by arranging pixel values for the respective colors in accordance with the above-described positional relation (P1 to P8) for the red pixels 5r, the green pixels 5g, and the blue pixels 5b (cf. FIG. 9 in each image data 50 to be synthesized, for example. At this time, when pixel values are located at the same position, an average value is used, for example.

The synthetic data 6r, 6g, 6b of the respective colors obtained as described above are arranged in a staggered pattern as illustrated in FIG. 10B, for example. Thus, the green synthetic data 6g matches the Bayer arrangement, but the red synthetic data 6r and the blue synthetic data 6b differs from the Bayer arrangement. Therefore, for the red synthetic data 6r and the blue synthetic data 6b, the camera controller 140 performs complement operation on pixel values at positions corresponding to the Bayer arrangement, based on pixel values adjacent to each other, to generate the red complementary data 6ra and the blue complementary data 6ba as illustrated in FIG. 10C, for example.

Furthermore, as illustrated in FIGS. 10B to 10D, the camera controller 140 combines the red complementary data 6ra, the blue complementary data 6ba, and the green synthetic data 6g to generate the image data 60 indicating the synthetic image of the Bayer arrangement (S23). In step S23, the camera controller 140 may output, as a processing result, the image data 60 in the Bayer arrangement as a raw image format (RAW format) or may appropriately convert the image data 60 in the Bayer arrangement into image data in a JPEG format or the like.

After generating the image data of the synthetic image (S23), the camera controller 140 ends the processing shown in this flowchart.

On the other hand, when determining that the positional deviation between the selected captured images is not within the range of the allowable value (NO in S22), the camera controller 140 does not perform the image synthesis processing (S23). In this case, the camera controller 140 causes the liquid crystal monitor 120 to display an error message or the like indicating that the high-res synthesis processing fails (S24), and ends the processing of this flow, for example.

According to the high-res synthesis processing (S3 in FIG. 3), when the positional deviation between the plurality of captured images is within the range of the allowable value (YES in S22), the synthetic image can be generated. As the camera shake in the plurality of captured images is smaller, the higher-quality synthetic image can be obtained.

In step S21 described above, the example where image data to be synthesized is selected from the image shooting result of the shooting display processing (S2) is described. The processing of step S21 is not particularly limited to the above, and image data to be synthesized may be generated from image data as the image shooting result of the shooting splay processing (S2), for example. For example, the camera controller 140 may perform interpolation processing by weighted averaging or the like in the plurality of captured images in the shooting display processing (S2) in accordance with the above-described positional relation (P1 to P8 in FIG. 9) of the synthesis targets, to generate image data to be synthesized in accordance with each of the corresponding positions P2 to P8.

In step S21, the camera controller 140 may appropriately perform the image data processing so as to deviate or rotate the captured image in accordance with the detected positional deviation from the reference image. The reference image is not necessarily limited to the first captured image but may be selected from the second and subsequent captured images or may be generated by interpolation processing or the like. In the processing of step S21, a captured image having a positional deviation within the range of the allowable values may be preferentially used as appropriate.

3. Summary

As described above, the digital camera 1 as an example of the imaging apparatus according to the present embodiment includes; the image sensor 110 as an example of the image sensor; the camera controller 140 as an example of the controller; the gyro sensor 184 as an example of the shake detector; and the liquid crystal monitor 120 as an example of the display. The image sensor 110 captures a subject image do generate image data. The camera controller 140 controls an image shooting operation to generate image data indicating a synthetic image obtained by synthesizing a plurality of captured images based on image data resulting from a plurality of times of imaging by the image sensor. The gyro sensor 184 detects the shaking state of the digital camera 1. The liquid crystal monitor 120 displays information. In the image shooting operation for the synthetic image such as the handheld high-res shooting operation, the camera controller 140 controls the liquid crystal monitor 120 to display the camera shaking state screen as an example of the camera shaking state information including the plurality of camera shaking states detected by the gyro sensor 184 during the plurality of times of imaging by the image sensor 110 (cf. FIG. 4).

According to the digital camera described above, the camera shaking state during the plurality of times of imaging is made visible to the user on the camera shaking state screen, whereby it is possible to facilitate the shooting of the synthetic image even in a situation where the camera shake occurs.

In the present embodiment, the camera controller 140 controls the liquid crystal monitor 120 to separately display the shaking state for each time of imaging among the plurality of times of imaging on the camera shaking state screen (S12 to S16, cf. FIG. 6). This can facilitate the user to see the shaking state for each time of imaging on the camera shaking state screen. Hence, it is possible to facilitate the user to suppress the camera shake and to shoot the synthetic image.

In the present embodiment, the camera shaking state screen includes a camera shake pointer 40 being an example of a pointer that is plotted in accordance with a shaking state for each time of imaging in the plurality of times of imaging. The camera shake pointer 40 can facilitate the user to see the shaking state for each time of imaging by simple display and to shoot the synthetic image.

In the present embodiment, the camera shaking state screen further includes the scope portion 30 as an example of the reference area indicating the reference of the shaking state. The camera controller 140 causes the liquid crystal monitor 120 to display the camera shaking state screen so that the camera shake pointer 40 is plotted in the scope portion 30 in accordance with the camera shaking state during each time of imaging in the plurality of times of imaging (S12 to S16, refer to FIG. 6). In this manner, by the camera shake pointer 40 sequentially plotted and displayed during the image shooting operation for the synthetic image, the user can easily understand the camera shaking state in the running image shooting operation.

As described above, the shaking state for each time of imaging to be displayed does not have to be the shaking state for every time of imaging in the imaging operation for the synthetic image, and some times of imaging of all times may be omitted, or a predetermined number of times of imaging may be collected.

In the present embodiment, the camera shaking state screen includes the preview image 20 captured before the synthetic image shooting operation. In the synthetic image shooting operation, the camera controller 140 may control the liquid crystal monitor 120 to move the preview image 20 in accordance with the shaking state for the first imaging, for example. The user can also see the camera shaking state by the moving of the preview image 20.

In the present embodiment, the camera controller 140 synthesizes a plurality of captured images having positional deviations from each other, based on the image data resulting from the plurality of times of imaging to generate image data indicating a synthetic image (S3). According to this, it is possible to obtain a synthetic image having higher resolution than one captured image, such as a high-resolution synthetic image. At the time of obtaining a plurality of captured images having an appropriate positional deviation as described above, the camera shaking state screen is viewed to the user, whereby it is possible to obtain an appropriate camera shake.

In the present embodiment, the digital camera 1 includes the IBIS processor 183 and the sensor driver 181 as examples of the image stabilizer. The camera controller 140 acquires the camera shake information indicating the camera shaking state after the stabilization by the image stabilizer and causes the liquid crystal monitor 120 to display the camera shaking state screen in accordance with the acquired camera shaking state (S13 to S14). Also, when such an IBIS function is used, the camera shaking state screen is useful.

Second Embodiment

A second embodiment of the present disclosure will be described with reference to FIGS. 11 and 12. In the first embodiment, the digital camera 1 that displays the camera shaking state during a plurality of times of imaging on the camera shaking state screen is described. In the second embodiment, a digital camera 1 that erases the display of a camera shaking state for past image shooting in a timely manner will be described.

The digital camera 1 according to the present embodiment will be described below by appropriately omitting descriptions of configurations and operations similar to that of the digital camera 1 according to the first embodiment.

Figure 11:
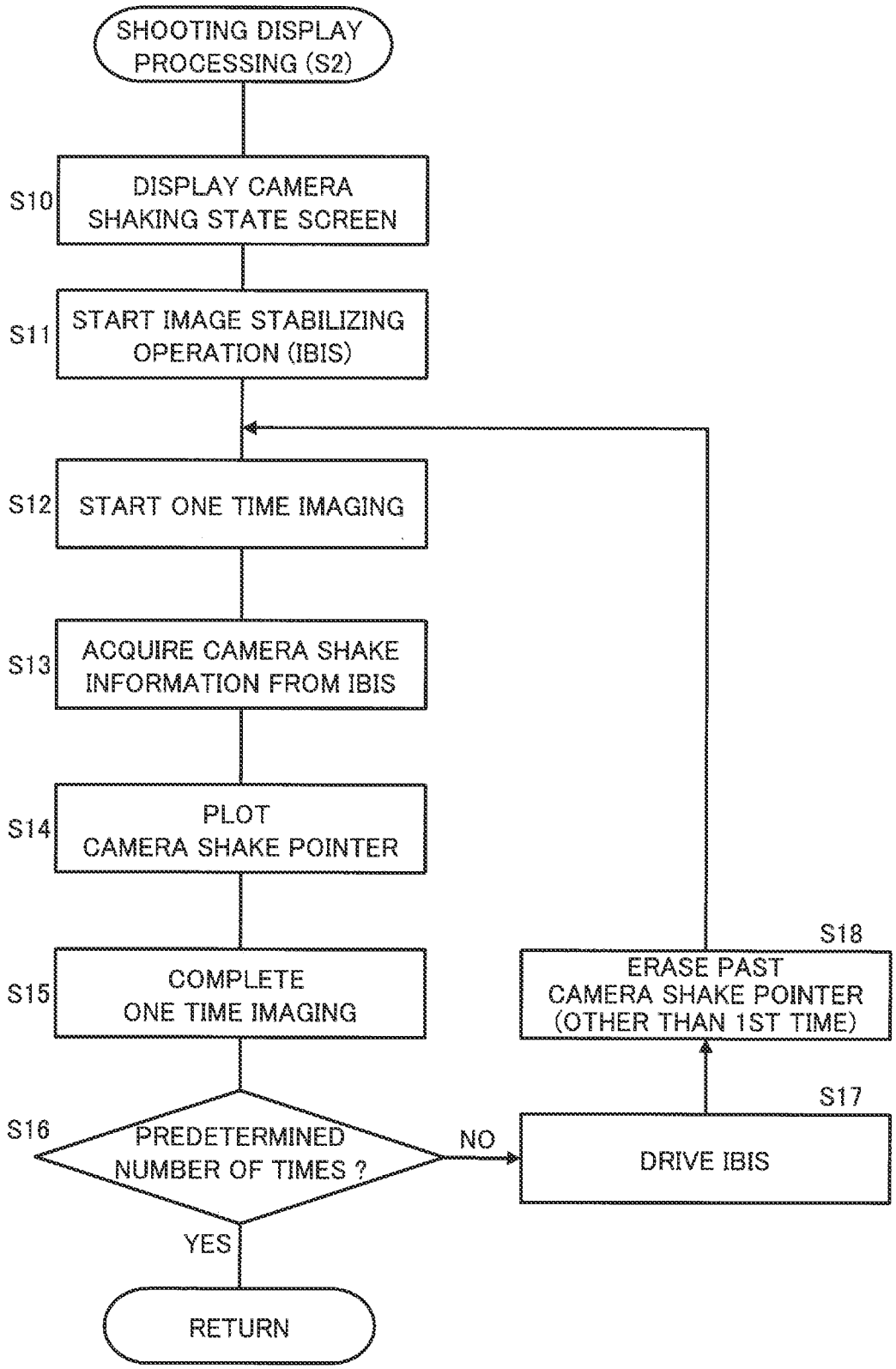
FIG. 11 is a flowchart illustrating shooting display processing of a digital camera according to a second embodiment.

FIG. 11 is a flowchart illustrating the shooting display processing of the digital camera 1 according to the second embodiment. In the digital camera 1 of the present embodiment, the camera controller 140 performs display control to gradually erase the past camera shake pointer 40 displayed in step S14 (S18), in addition to performing steps S10 to S17 of the shooting display processing (FIG. 5) of the first embodiment. The display control in step S18 will be described with reference to FIG. 12.

Figure 12:
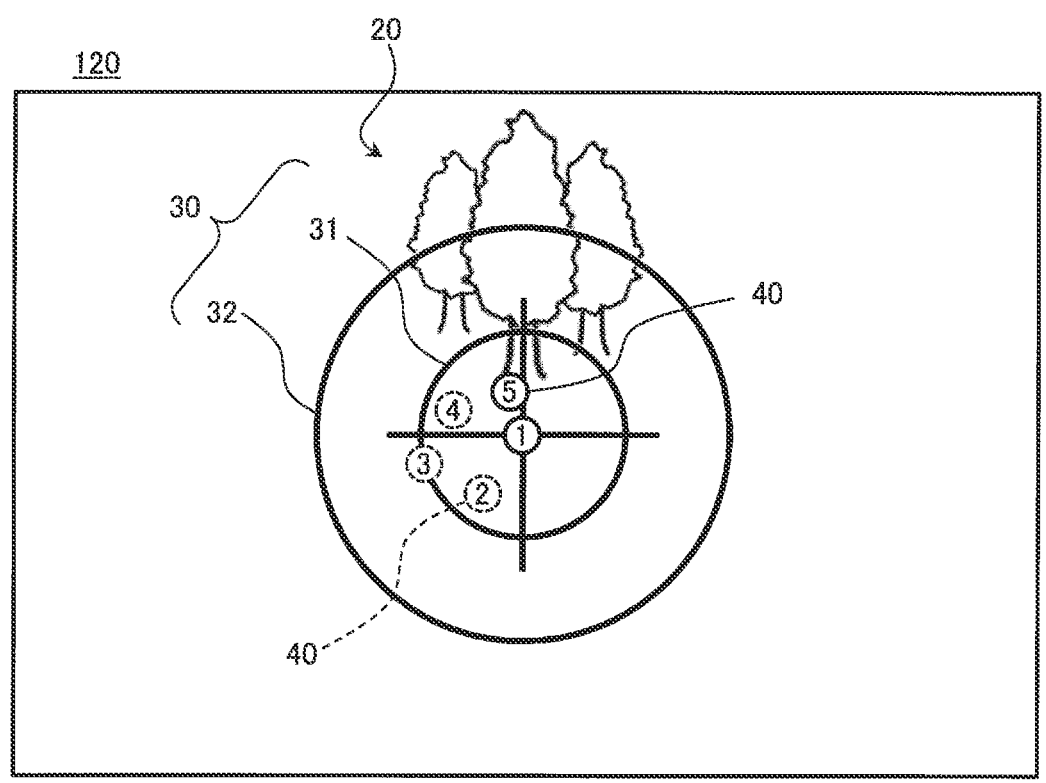
FIG. 12 is a view illustrating a camera shaking state screen of a digital camera according to the second embodiment.

FIG. 12 illustrates a camera shaking state screen of the digital camera according to the second embodiment. FIG. 12 illustrates a display example of a camera shaking state screen during the fifth imaging in the shooting display processing of the present embodiment. In this example, the liquid crystal monitor 120 displays fifth and first camera shake pointers 40 on the camera shaking state screen under the control of the camera controller 140 (S14) but does not display second to fourth camera shake pointers 40 displayed in the past (S18).

For example, at displaying (S14) a new camera shake pointer 40 in each time of imaging in the shooting display processing to (S12 to S18), the camera controller 140 causes the plot display of the previous camera shake pointer 40, except for the first camera shake pointer 40, to be erased sequentially (S18). According to the display control in step S18, the plot display of the camera shake pointer 40 on the camera shaking state screen can be simplified to facilitate the user to understand the current camera shaking state. At this time, leaving the display of the first camera shake pointer 40 can facilitate the user to see how much the current camera shaking state has changed from the time of the first image shooting.

The display control in step S18 is not particularly limited to the above and may be various display controls for gradually erasing the display of the past camera shake pointer 40. For example, the camera controller 140 may remain the plot display of the previous camera shake pointer 40 or may cause the plot display of the past camera shake pointers 40 for a predetermined number of times before the previous plot display to be erased (S18). The camera controller 140 may perform display control of various fade-outs for the past camera shake pointer 40 to reduce the degree of highlight display e.g. lightness or saturation of the plot display, to increase the transparency of the plot display, or the like. The display of the first camera shake pointer 40 does not necessarily need to be left and may be erased appropriately.

As described above, in the present embodiment, the camera controller 140 controls the liquid crystal monitor 120 to gradually erase the past shaking state in the shaking state included in the displayed camera shaking state screen during the synthetic image shooting operation (S18). This can simplify the display of the camera shaking state screen and further facilitate the user to see the camera shaking state.

Other Embodiments

As the above, the first and second embodiments have been described as examples of the techniques disclosed in the present application. However, the techniques in the present disclosure are not limited thereto but can also be applied to embodiments in which modifications, substitutions, additions, or omissions are made as appropriate. Further, each of the constituents described n the first and second embodiments can be combined to form a new embodiment. Other embodiments will be described below.

In the first and second embodiments described above, the camera shaking state screen has been illustrated, but the camera shaking state screen is not limited thereto. Modifications of the camera shaking state screen will be described with reference to FIGS. 13 to 16.

Figure 13:
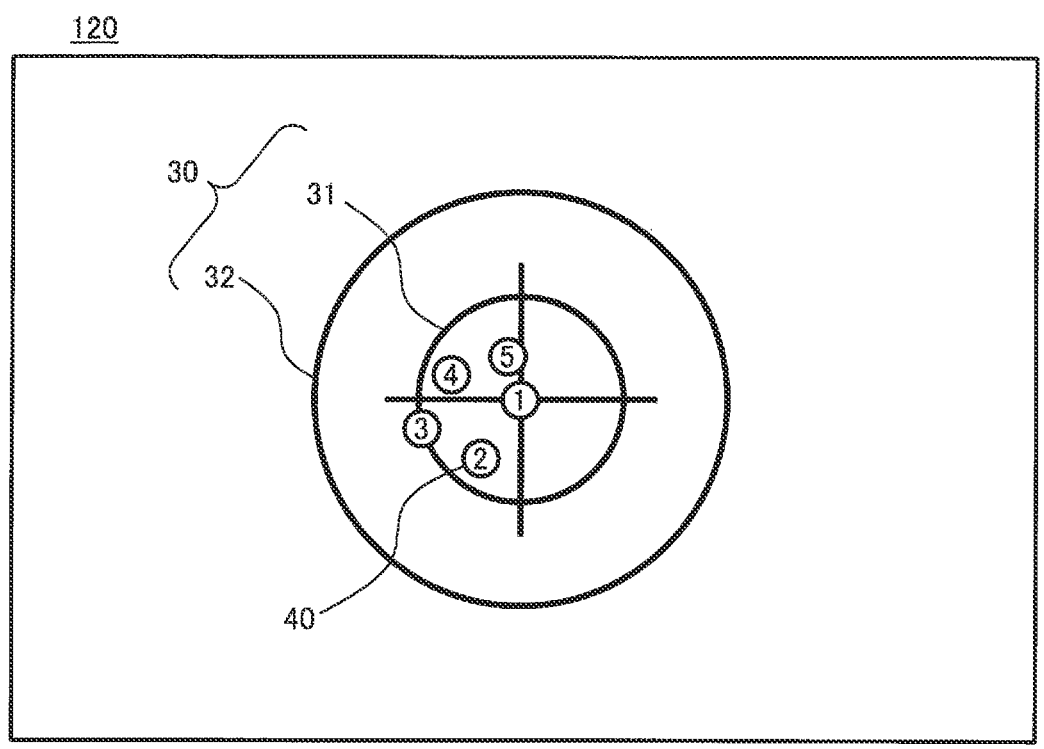
FIG. 13 is a view illustrating a first modification of the camera shaking state screen the digital camera.

FIG. 13 is a view illustrating a first modification of the camera shaking state screen of the digital camera 1. In the above embodiments, the camera shaking state screen including the preview image 20 has been illustrated. In the present embodiment, the camera shaking state screen may not include the preview image 20, for example, as illustrated in FIG. 13. Even with such a camera shaking state screen on which the preview image 20 is not displayed, by updating the display of the camera shake pointer 40 in turn during the plurality of times of imaging, it is possible to facilitate the user to see the camera shaking state as in the above embodiments.

Figure 14:
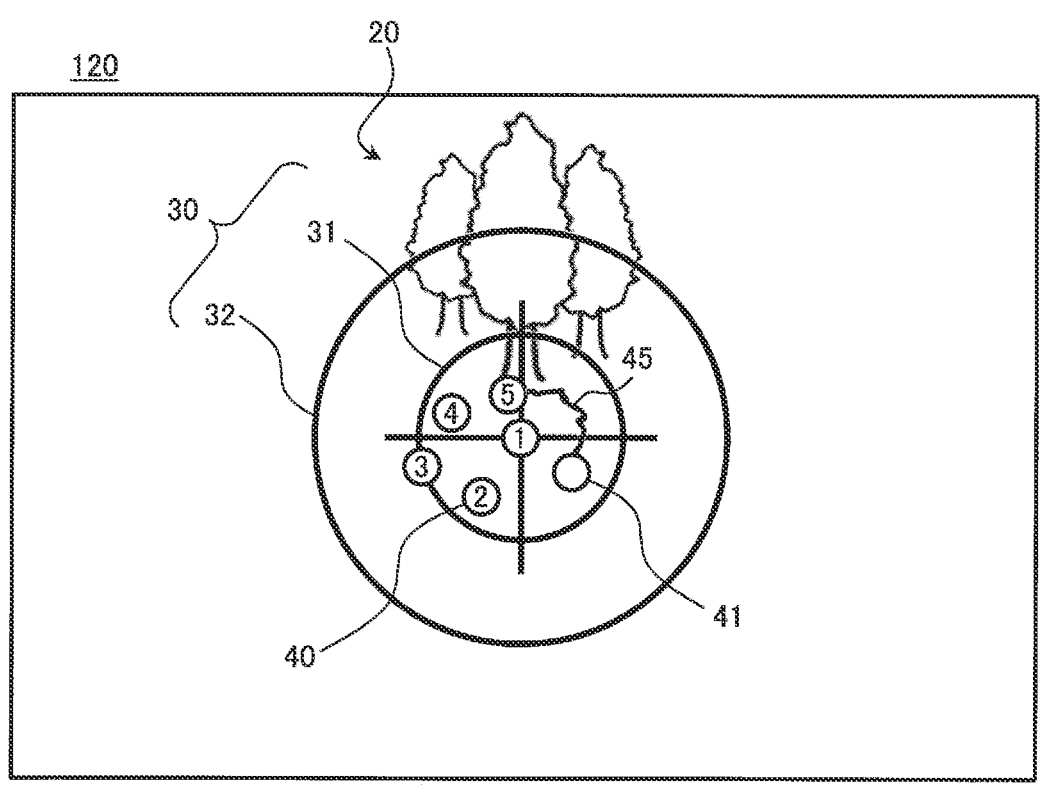
FIG. 14 is a view illustrating second modification of the camera shaking state screen of the camera.

FIG. 14 illustrates a second modification of the camera shaking state screen of the digital camera 1. In the present embodiment, a camera shake pointer 41 may be displayed on the camera shaking state screen so as to move in accordance with the camera shaking state during imaging. A trajectory 45 of the camera shake pointer 41 moving during one time of imaging may be displayed on the camera shaking state screen of the present embodiment, for example. For example, the camera controller 140 sequentially acquires camera shake information during each time of imaging (S12 to S15), changes the display position of the camera shake pointer 40 following a change in the camera shake information, and draws the trajectory 45. For example, whenever one time of imaging is completed, the camera controller 140 causes the camera shake pointer 40 to be plotted and causes the trajectory 45 corresponding to the completed imaging to be erased.

As described above, in the present embodiment, the camera controller 140 may move the camera shake pointer 40 on the scope portion 30 of the camera shaking state screen in accordance with the shaking state for onetime of image capturing in the synthetic image shooting operation. Such display of the camera shaking state screen can also facilitate the user to see the camera shaking state.

Figure 15:
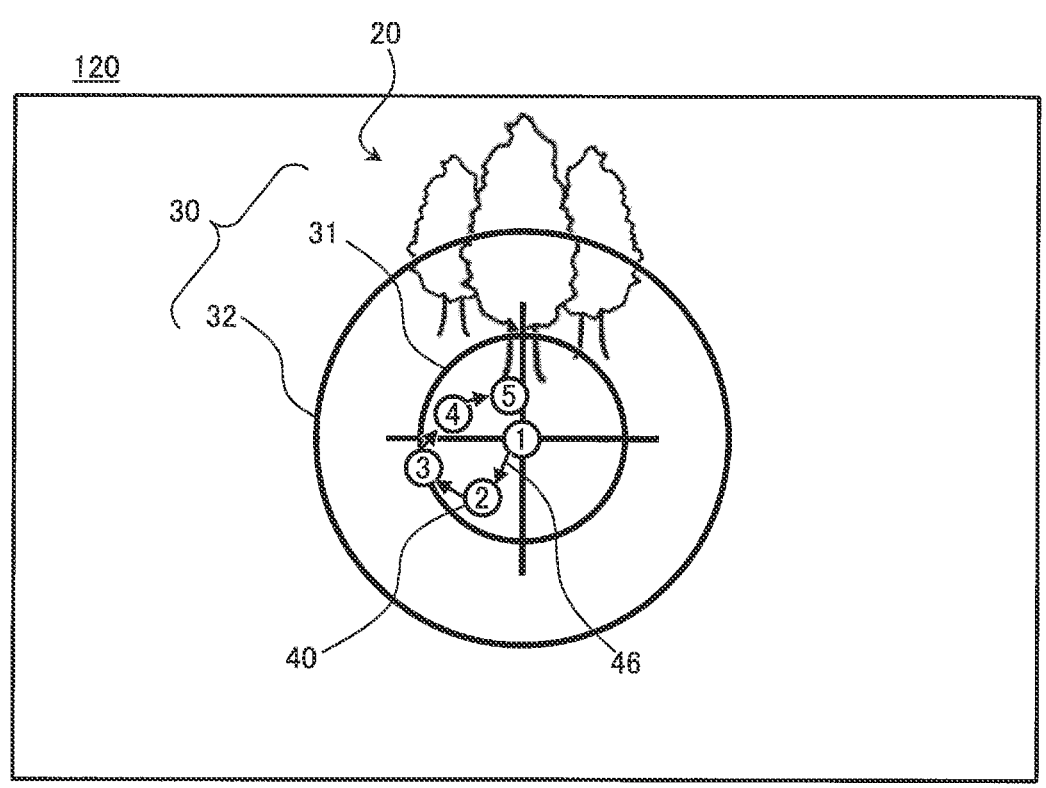
FIG. 15 is view illustrating a third modification of the camera shaking state screen of the digital camera.

FIG. 15 illustrates a third modification of the camera shaking state screen of the digital camera 1. In the camera shaking state screen of the present embodiment, an arrow 46 or the like may be displayed between a plurality of camera shake pointers 40 plotted corresponding to the plurality of times of imaging. For example, upon plotting a new camera shake pointer 40 (S14), the camera controller 140 may cause an arrow 46 to be displayed, wherein the arrow 46 is directed from the camera shake pointer 40 plotted last time to the new camera shake pointer 40.

Figure 16A:
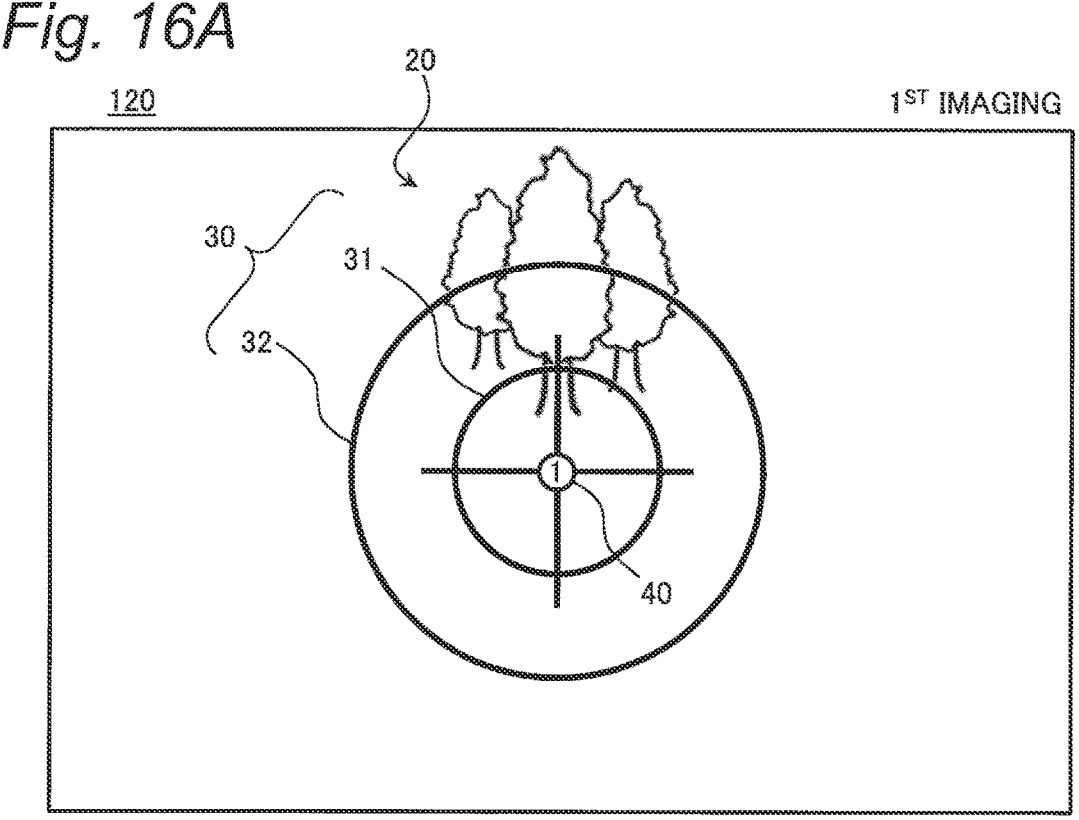
FIGS. 16A and 16B are views illustrating a fourth modification of the camera shaking state screen of the digital camera.
Figure 16B:
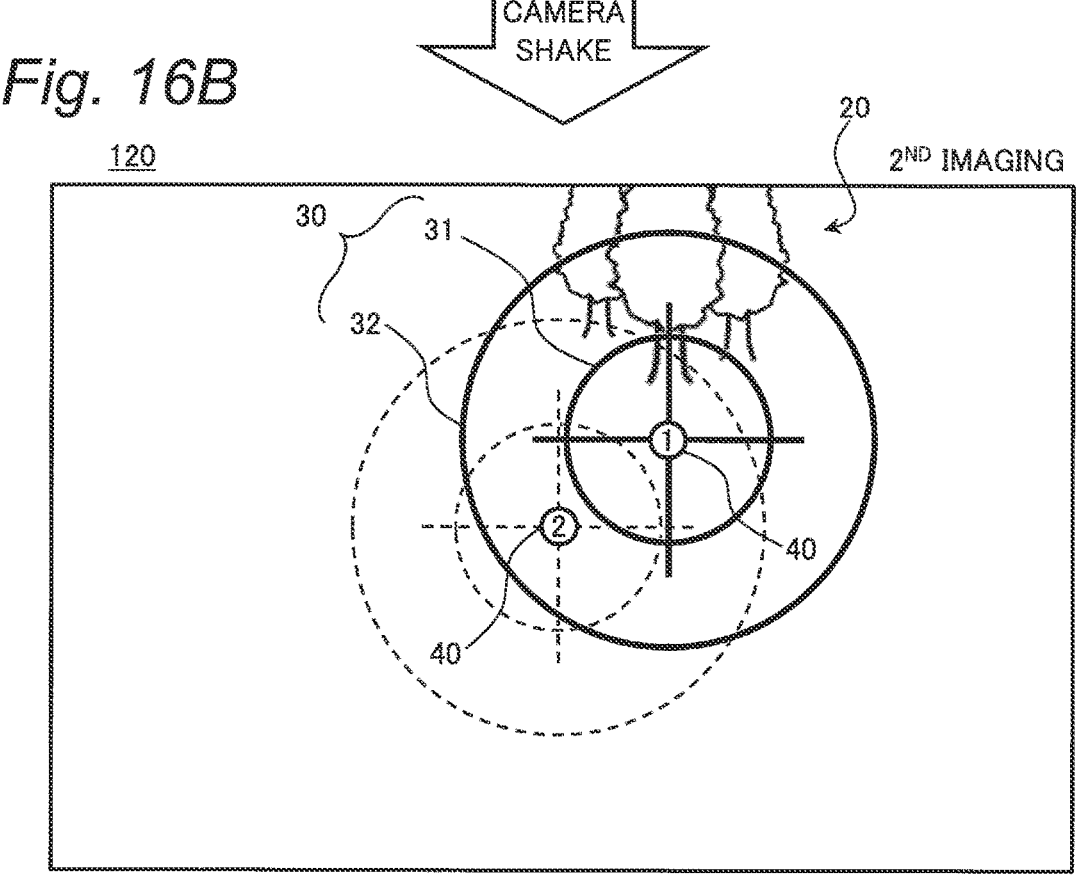

FIGS. 16A and 16B illustrate a fourth modification of the camera shaking state screen of the digital camera 1. In the camera shaking state screen of the present embodiment, the preview image 20 may be sequentially moved as illustrated in FIGS. 16A and 16B during the plurality of times of imaging. For example, the camera controller 140 may move the preview image 20 on the camera shaking state screen by the amount of camera shake each time, based on the camera shake information (S13) acquired for each time of imaging. At this time, the plot display of the new camera shake pointer 40 (S14) is performed at a predetermined position such as the center of the screen, and the camera shake pointer 40 plotted in the past as well as the scope portion 30 may be moved together with the preview image 20.

In the above embodiments, an example of the scope portion 30 in the camera shaking state screen has been described, but the scope portion 30 is not particularly limited thereto. The scope portion 30 is not limited to the two concentric areas 31, 32 but may include three or more areas or may be one area. Furthermore, each of the areas 31, 32 of the scope portion 30 is not particularly limited to a circular shape and may have a rectangular shape or various shape. The scope portion 30 may display various direction references not particularly limited to the cross lines or may not particularly display such direction references.

In the above embodiments, an example of the camera shake pointer 40 on the camera shaking state screen has been described, but the camera shake pointer 40 is not particularly limited thereto. For example, in the present embodiment, the number of the camera shake pointer 40 may not be particularly displayed. The shape of the camera shake pointer 40 is not particularly limited to a circular shape and may be various shapes. For example, the direction in which the camera shake pointer 40 is plotted may be set in accordance with the camera shake in the roll direction.

In the above embodiments, the handheld high-res shooting operation has been described as an example of the image shooting operation for the synthetic image, but the image shooting operation for the synthetic image is not particularly limited thereto. For example, the image shooting operation for the synthetic image of the present embodiment may be a so-called real resolution image shooting operation in which a captured image having a positional deviation in units of one pixel is set as synthesis target. For example, the synthesis target may be the reference image in FIG. 9 and the captured images which corresponds to the corresponding positions P3, P4, P5 having the positional relation of deviating in units of pixel pitches W with respect to the reference position P1. In the case, instead of increasing the number of pixels as in the high-res synthesis processing (S3), the image synthesis processing may cause the synthetic image to include pixel values of three colors in each pixel. In such a case as well, similarly to the case of the high-res synthesis processing, the camera shake is easily suppressed with the camera shaking state screen in the shooting display processing (S2), so that a high-quality synthetic image can be obtained.

In the present embodiment, the image shooting operation for the synthetic image may use the captured image having no positional deviation as the synthesis target. For example, in an image shooting operation for image synthesis, such as depth synthesis or high dynamic range (HDR) synthesis, the camera shaking state screen of the shooting display processing (S2) described above may be applied.

In the above embodiments, the example has been described where the IBIS processor 183 performs the image stabilizing operation in the synthetic image shooting operation, but the present invention is not particularly limited thereto. For example, during the image shooting operation for the synthetic image, the IBIS processor 183 may not perform the image stabilizing operation. Additionally or alternatively to the image stabilizing operation, the IBIS processor 183 may perform an operation of shifting pixels by a predetermined value such as ½-pixel units in step S17, for example. The OIS processor 223 may operate alternatively or additionally to the operation of the IBIS processor 183. In this case, the camera controller 140 may acquire the camera shake information by data communication with the OTS processor 223.

In the above embodiments, liquid crystal monitor 120 is illustrated as an example of the display. In the present embodiment, the display is not limited to the above but may be various monitors other than the liquid crystal monitor or may be a viewfinder such as an electronic view finder (EVF) or other various display devices.

In the above embodiments, the lens-interchangeable digital camera has been described as an example of the imaging apparatus; however, the imaging apparatus of the present embodiment may be a digital camera that is not particularly a lens-interchangeable type. The idea of the present disclosure may not only be a digital camera but also be a movie camera and can also be applied to electronic device having various image shooting functions such as a portable telephone with a camera, a smartphone, or a personal computer (PC).

As described above, the embodiments have been described as examples of the techniques in the present disclosure. To that end, the accompanying drawings and detailed description thereof have been provided.

Therefore, the constituents described in the accompanying drawings and the detailed description may include not only constituents essential for achieving an object of the present disclosure but also constituents not essential for achieving it, for the purpose of exemplifying the above techniques. Thus, those non-essential constituents should not be immediately recognized as essential by the fact that those non-essential constituents are described in the accompanying drawings or in the detailed description.

With the above embodiments being intended to illustrate the techniques in the present disclosure, various modifications, substitutions, additions, omissions, and the like can be made within the scope of the claims or the equivalents thereto.

The concept of the present disclosure can be applied to an electronic device (imaging apparatuses such as digital cameras, camcorders, mobile phones, smartphones, and the like) having an image shooting function provided with an image shooting function for a synthetic image.

The invention claimed is:

1. An imaging apparatus comprising:
   an image sensor that captures a subject image to generate image data;
   a controller that controls an image shooting operation, based on image data resulting from a plurality of times of imaging by the image sensor, the image shooting operation generating image data indicating a synthetic image into which a plurality of captured images is synthesized;
   a shake detector that detects a shaking state of the imaging apparatus; and
   a display that displays information,
   wherein the controller controls the display to display shaking state information including a plurality of shaking states detected by the shake detector during the plurality of times of imaging by the image sensor in the image shooting operation for the synthetic image, by displaying, for each time of imaging among the plurality of times of imaging, a shaking state separately in the shaking state information.

2. The imaging apparatus according to claim 1, wherein the controller controls the display to display the shaking state information with one discrete pointer being plotted in accordance with a shaking state per one exposure period for each time of imaging in the plurality of times of imaging.

3. The imaging apparatus according to claim 2, wherein the shaking state information further includes a reference area indicating a reference of the shaking state, and the controller controls the displayed shaking state information on the display to plot the pointer in the reference area in accordance with the shaking state for each time of imaging in the plurality of times of imaging.

4. The imaging apparatus according to claim 1, wherein the shaking state information includes a preview image captured before the image shooting operation for the synthetic image, and the controller controls the display to move the preview image in accordance with the shaking state in the image shooting operation for the synthetic image.

5. The imaging apparatus according to claim 1, wherein the controller controls the display to gradually erase a past shaking state in the shaking state included in the displayed shaking state information during the image shooting operation for the synthetic image.

6. The imaging apparatus according to claim 1, wherein based on the image data resulting from the plurality of times of imaging, the controller synthesizes the plurality of captured images having positional deviations from each other, to generate image data indicating the synthetic image.

7. The imaging apparatus according to claim 1, further comprising an image stabilizer that drives the image sensor, based on a result of the detection by the shake detector, to perform image stabilization, wherein the controller acquires a shaking state stabilized by the image stabilizer and causes the display to display the shaking state information in accordance with the acquired shaking state.

* * * * *